United States Patent [19]

Niemeyer, III

[11] Patent Number: 4,896,170

[45] Date of Patent: Jan. 23, 1990

[54] LOCKING PEN SUPPORT MEANS FOR GRAPHIC RECORDER

[75] Inventor: Robert H. Niemeyer, III, Beaverton, Oreg.

[73] Assignee: AM International Corporation, Chicago, Ill.

[21] Appl. No.: 206,708

[22] Filed: Jun. 16, 1988

Related U.S. Application Data

[63] Continuation-in-part of Ser. No. 75,533, Jul. 19, 1987, Pat. No. 4,763,140.

[51] Int. Cl.$^4$ .................. G01D 9/30; G01D 11/00; G01D 11/02
[52] U.S. Cl. .................. 346/139 R; 346/46; 364/520
[58] Field of Search .................. 346/139 R, 29, 46, 49, 346/140 R, 141; 364/520

[56] References Cited

U.S. PATENT DOCUMENTS 4,157,552  6/1979  Nakajima .................. 346/139 R
4,763,140  8/1988  Niemeyer .................. 346/139 R Primary Examiner—B. A. Reynolds
Assistant Examiner—Mark Reinhart
Attorney, Agent, or Firm—Roy A. Ekstrand; Nicholas A. Camasto

[57] ABSTRACT

A graphic recording system includes a pen carriage supporting a plurality of pen shuttles which support a plurality of recording pens in a linear array together with means for moving the pen carriage in a carriage path. A rotary actuation system is supported by and operative to engage selected ones of the pen shuttles to move a selected one of the recording pens into contact with the recording media. The rotary actuating system is operated by an elongated actuator beam supported in parallel with the carriage path and coupled to the rotary actuating system. A brake within the rotary actuator is operative to engage the actuator beam and permit alignment of the rotary actuator with a selected pen shuttle within the pen carriage array by movement of the pen carraige. Each recording pen is secured to its respective pen shuttle by a bayonet mounting system such that the recording pens are secured to the pen shuttles in a twist-lock assembly.

14 Claims, 4 Drawing Sheets

FIG. 4
FIG. 5
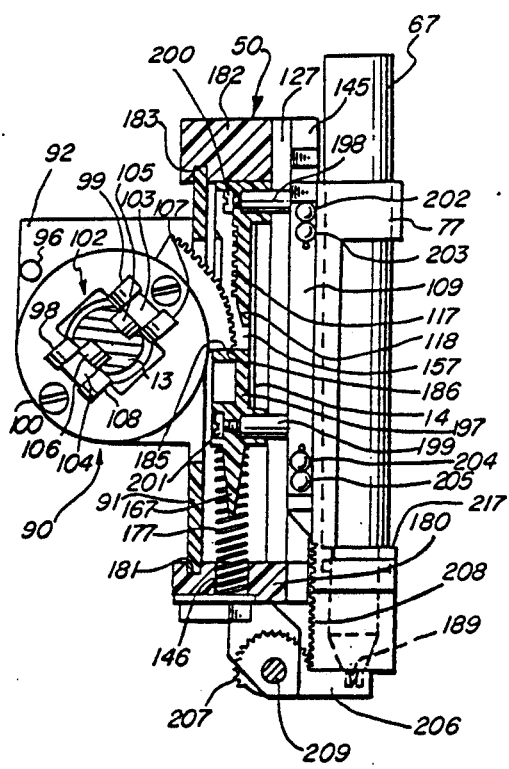
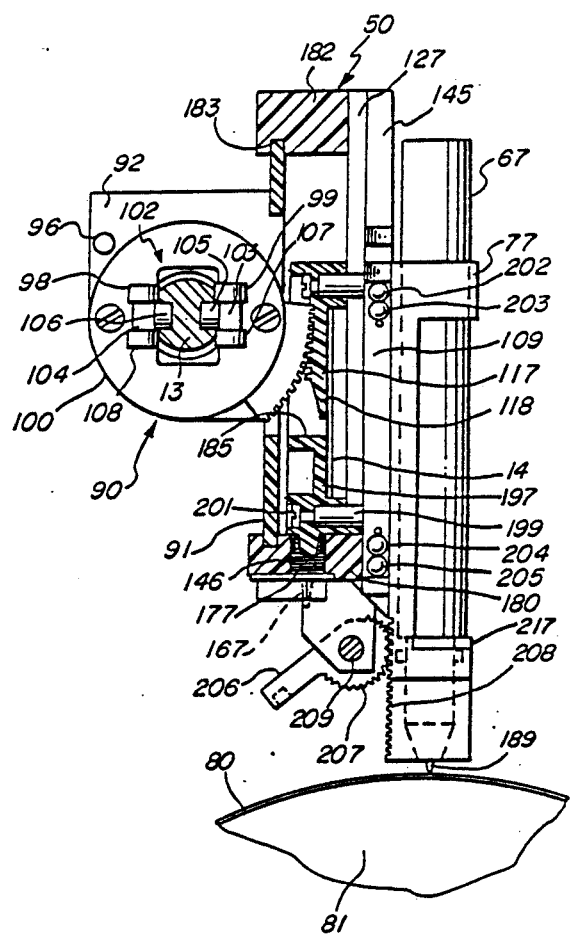

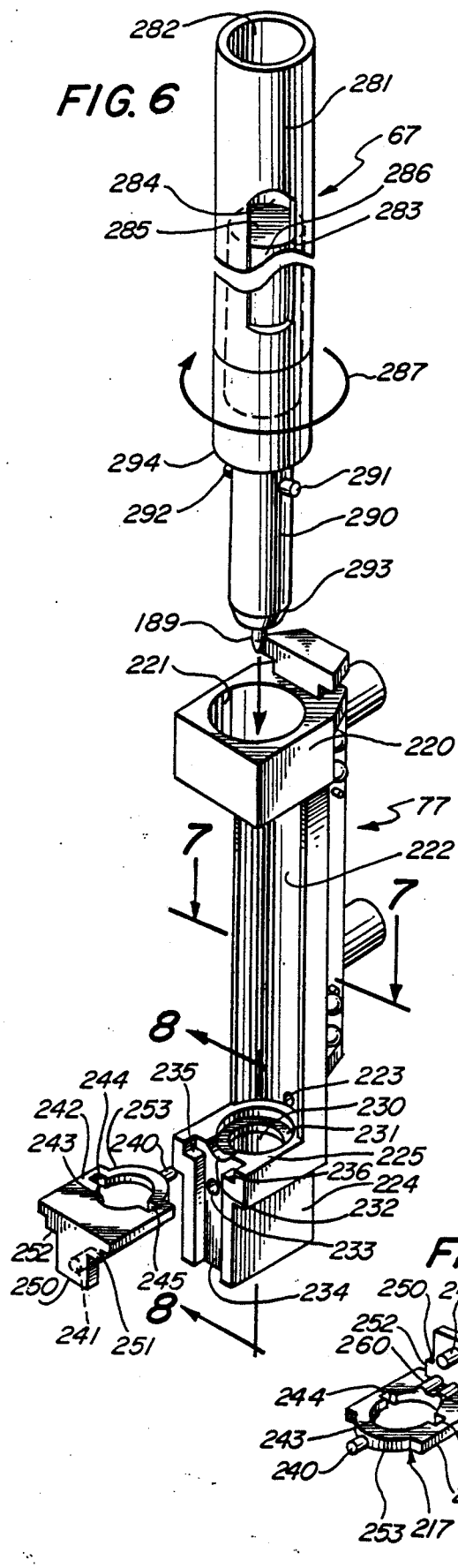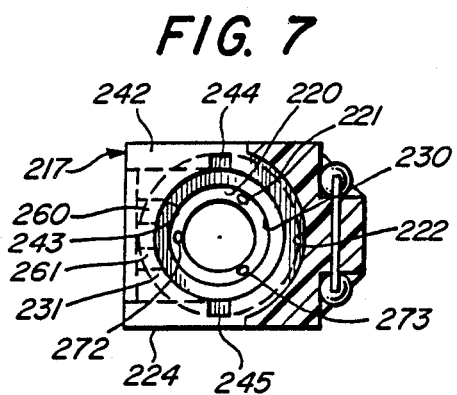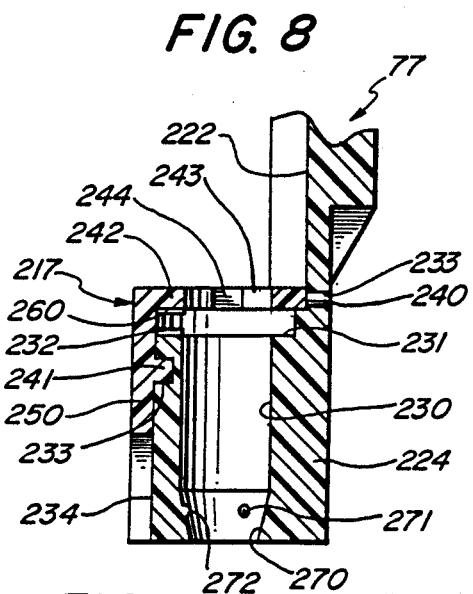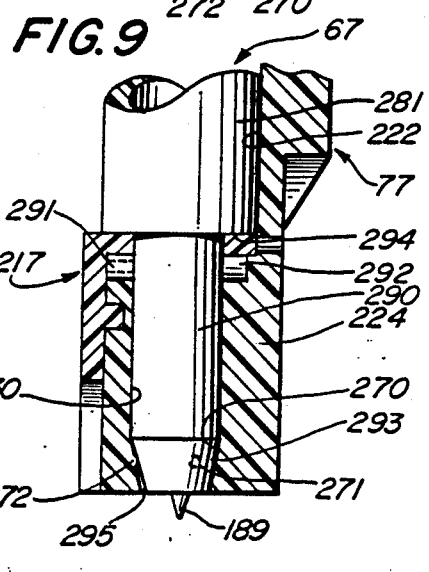

LOCKING PEN SUPPORT MEANS FOR GRAPHIC RECORDER

CROSS REFERENCE TO RELATED APPLICATION

This application is a continuation in part of a copending application entitled ROTARY ACTION GRAPHIC RECORDING SYSTEM, filed July 20, 1987 in the name of Robert Niemeyer III, Ser. No. 07/075,533 now U.S. Pat. No. 4,763,140 and assigned to the assignee of the present application and which is hereby incorporated by reference.

FIELD OF THE INVENTION

This invention relates generally to graphic recording systems and particularly to those in which a plurality of replaceable recording elements are carried by a moveable carriage and in which a recording media is moved relative to the path of carriage motion to provide a desired recording upon the media.

BACKGROUND OF THE INVENTION

A substantial number of graphic recording systems have been developed to provide computer controlled graphic recording upon a media. While the individual structures of such graphic recorders vary substantially, generally all include a media transport system in which the media is moved in a first direction while a moveable pen carriage is moved in a second direction relative to media motion. In most instances, the directions of media movement and pen carriage movement are orthogonal.

While many systems utilize a pen carriage supporting a single recording pen, the development of computer drive systems having increased capability has made possible the use of graphic recording systems employing a plurality of recording pens. Most commonly, these multiple pen systems provide multiple color selection.

Because recording pens wear and require replacement and because graphic recording system users often wish to change pens and pen types, graphic recording systems generally provide for interchange and replacement of the recording pens. In the most common system for securing the recording pen or pens to the pen carriage, one or more threaded supports are formed within the pen carriage and recording pens defining cooperating threaded portions are received within the threaded supports. Because the recording pens are subjected to substantial vibration and stress in their typical use, it is necessary to secure the recording pens within the pen carriage in a rigid dependable attachment. In systems utilizing the above-described threaded attachment for the recording pens, a problem often arises in determining the proper securing torque to be applied when mounting a pen to the pen carriage. In the event an excess torque is applied, the threads of the pen carriage or the pen may be damaged. Conversely, in the event insufficient torque is applied, the stresses and vibrations imposed upon the pen may cause it to loosen during use. To meet this problem, several graphic recording system manufacturers have provided elaborate locking systems to further secure the recording within the pen carriage.

While the prior art systems have exhibited some degrees of success in securely attaching replaceable recording pens to the pen carriage, they often make the task of changing recording pens more difficult and time consuming than it should be. In multi-pen systems having six to ten recording pens, the more lengthy interruption of operation required to change recording pens due to the intricacies of their mounting systems may be particularly objectionable.

There remains, therefore, a need in the art for an improved recording pen attachment system for quickly and easily replacing or interchanging one or more recording pens within the pen carriage of a graphic recording system.

SUMMARY OF THE INVENTION

Accordingly, it is a general object of the present invention to provide an improved graphic recording system. It is a more particular object of the present invention to provide an improved graphic recording system having an improved system for securing the recording pens upon the moveable pen carriage which facilitates quick and easy pen changes while maintaining reliability of recording pen attachment to the pen carriage.

In accordance with the present invention, there is provided for use in a graphic recording system having a moveable pen carriage, pen support means upon the moveable pen carriage which comprise a recording pen having a generally cylindrical portion and a plurality of mounting appendages extending outwardly therefrom; a pen receptacle having a passage configured to receive the cylindrical portion of the recording pen; and locking means coupled to the pen receptacle receiving the mounting appendages in a first rotational position of the recording pen and securing the cylindrical portion of the recording pen within the receptacle in a second rotational position of the recording pen.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

FIG. 4 is a section view of the moveable pen carriage of FIG. 3 taken along section lines 4—4 in FIG. 3 depicting the present invention locking pen support means in a nonrecording position;

FIG. 5 is a section view of the moveable pen carriage of FIG. 3 taken along section lines 4—4 in FIG. 3 depicting the present invention locking pen support means in the recording position;

FIG. 6 is an exploded view of the present invention locking pen support means;

FIG. 7 is a section view of the present invention locking pen support means taken along section lines 7—7 in FIG. 6;

FIG. 8 is a section view of a portion of the present invention locking pen support means taken along section lines 8—8 in FIG. 6 with the recording pen removed;

FIG. 9 is a section view of a portion of the present invention locking pen support means taken along section lines 8-8 in FIG. 6 in which the recording pen is secured within the locking pen support means; and FIG. 10 is an inverted perspective view of a portion of the present invention locking pen support means.

DESCRIPTION OF THE PREFERRED EMBODIMENT

Figure 1:
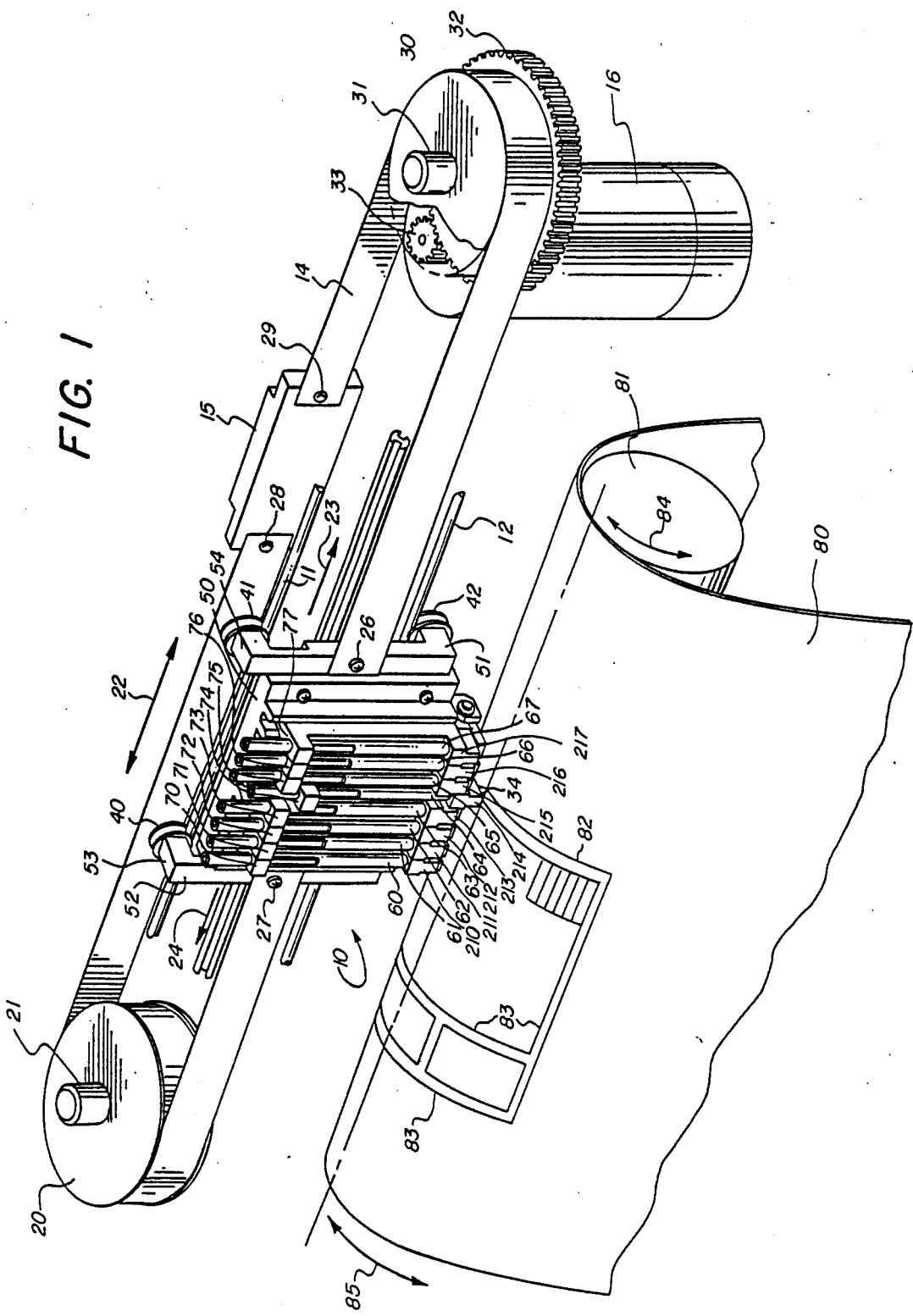
FIG. 1 is a general perspective view of a graphic recording system having locking pen support means constructed in accordance with the present invention.

FIG. 1 sets forth a perspective view of a rotary actuated graphic recording system having pen locking support means constructed in accordance with the present invention. A moveable pen carriage generally referenced by numeral 10 is secured to and controlled by a closed flexible carriage band 14 which comprises a flat ribbon-like band of stainless steel. An upper track 11 and lower track 12 are supported parallel to the motion path of the forward portion of carriage band 14 by means not shown but which may include any of the presently available track support structures used in graphic recorders to provide a substantially rigid construction in which upper track 11 and lower track 12 may support the weight and resist the vibrations of pen carriage 10.

Pen carriage 10 includes a pen shuttle guide 50 which in its preferred form is formed of a lightweight, rigid, plastic material. A pair of generally U-shaped wheel support members, also preferably formed of a lightweight, rigid, plastic material 51 and 52, are secured to pen shuttle guide 50 by means set forth below in greater detail. Wheel support 51 terminates at one end in a rearwardly extending axle support 54 and at the other end in a similar axle support 55. Wheel support 52 is identical to wheel support 51 and terminates at one end in a rearwardly extending axle support 53 and a rearwardly extending axle support 56 at the other end (the latter seen in FIG. 3). A quartet of grooved wheels 40, 41, 42, and 43 (better seen in FIG. 3) are rotatably secured to axle supports 53, 54, 55, and 56 respectively. Wheels 40 through 43 are configured to receive and provide a track engagement with upper track 11 and lower track 12. The resulting cooperation of wheels 40 through 43 and tracks 11 and 12 retains pen carriage 10 in a rolling engagement with upper track 10 and lower track 12 such that pen carriage 10 is freely moveable in the directions indicated by arrows 23 and 24.

Pen carriage 10, by means set forth below in greater detail, supports a plurality of generally elongated pen shuttles 70 through 77 which are moveably secured to pen shuttle guide 50 in a linear array. In the preferred arrangement pen shuttles 70 through 77 are generally perpendicular to the direction of travel of pen carriage 10. In accordance with an important aspect of the invention, pen shuttles 70 through 77 each support a corresponding one of a plurality of pens 60 through 67 respectively. In further accordance with an important aspect of the invention, pen shuttles 70 through 77 support a plurality of lock plates 210 through 217 respectively which lock pens 60 through 67 to pen shuttles 70 through 77 such that motion of a selected one of pen shuttles 70 through 77 results in a corresponding motion of the associated pen. By way of example, FIG. 1 depicts pen shuttles 70 through 73 and 75 through 77 in their raised position while pen shuttle 74 is shown in its downwardly extending or lowered position. Correspondingly, pens 60 through 63 and 65 through 67 are supported in their raised position by a spring better shown in FIG. 4 while pen 64 is supported in its downwardly extending position.

A media drive roller 81, which may be constructed in accordance with the presently known graphic recording system media drive structures, is supported by conventional means (not shown) such that its major axis is generally parallel to the travel path of pen carriage 10. A flexible media 80 comprising a long sheet representative of a typical media material is supported by media roller 81 such that rotational motion of media roller 81 in the path indicated by arrows 84 results in a corresponding linear motion of media 80.

A pair of pulleys 20 and 30 are rotatably supported by a pair of pulley supports 21 and 31 respectively. By means not shown but which may include any conventional pulley support mechanism, pulleys 20 and 30 are supported at opposite ends of the travel path of carriage band 14. The respective ends of carriage band 14 are joined by a pair of fasteners 28 and 29 to an elongated counter weight 15. Carriage band 14 extends through pen carriage 10 by means set forth below in greater detail. Pulley 20 comprises a free moving idler pulley while drive pulley 30 supports a ring gear 32. A carriage motor 16 which may comprise any of the number of presently available bidirectional electric motors supports a drive gear 33 which in accordance with generally accepted principles of graphic recorder construction is operatively coupled to the armature of carriage motor 16 (not shown) such that energizing carriage motor 16 results in rotating gear 33. Drive pulley 30 is supported with respect to gear 33 such that gear 33 engages gear 32 causing drive pulley 30 to rotate in response to energizing of carriage motor 16. By means not shown, but in accordance with generally accepted fabrication techniques, carriage band 14 is maintained in tension to provide effective coupling of motion between drive pulley 30 and carriage band 14. As a result, rotational drive pulley 30 produces corresponding motion of carriage band 14 in the path indicated by arrow 22 which in turn produces a corresponding motion of pen carriage 10 in the path indicated by arrows 23 and 24.

An elongated actuator beam 13 is supported in a substantially parallel relationship with the travel path of pen carriage 10 by means not shown and is operatively coupleable to selected ones of pen shuttles 70 through 77 to produce vertical motion of a selected one of pens 60 through 67.

In operation, electronic control means constructed in accordance with generally accepted graphic recording system techniques are operative to cause motor 16 to drive carriage band 14 and thereby pen carriage 10 back and forth along the travel path indicated by arrows 23 and 24 to produce motion of pen carriage 10 in either of two directions along the carriage travel path. Concurrently, the electronic control means are operatively coupled to media roller 81 through conventional fabrication techniques to rotate media roller 81 in either of the directions indicated by arrow 84 and cause a corresponding motion of media 80 in either of the directions indicated by arrow 85. By means set forth below in greater detail, a selected pen shuttle such as pen 74 is moved by rotation of actuator beam 13 in a downward direction until pen point 34 of pen 64 contacts the surface of media 80. Thereafter, under control of the electronic control means, combinations of pen carriage motion in directions indicated by arrows 23 and 24 together with coordinated motions of media 80 in the directions indicated by arrow 85 result in recording a plurality of line markings 83 upon media 80.

While pens 60 through 67 may comprise recording pens having a variety of pen characteristics, most commonly pens 60 through 67 will be selected to provide different color recording pens. Accordingly, by means set forth below in greater detail, operation of actuator beam 13 and the rotary pen actuation (described below) cooperate with carefully controlled motion of pen carriage 10 to permit the selective use of the desired one of pens 60 through 67. As will be set forth below in greater detail, pens 60 through 67 are subject to wear or other causes for replacement and, in accordance with the invention, are easily removed and replaced without disturbing pen carriage 10.

Figure 2:
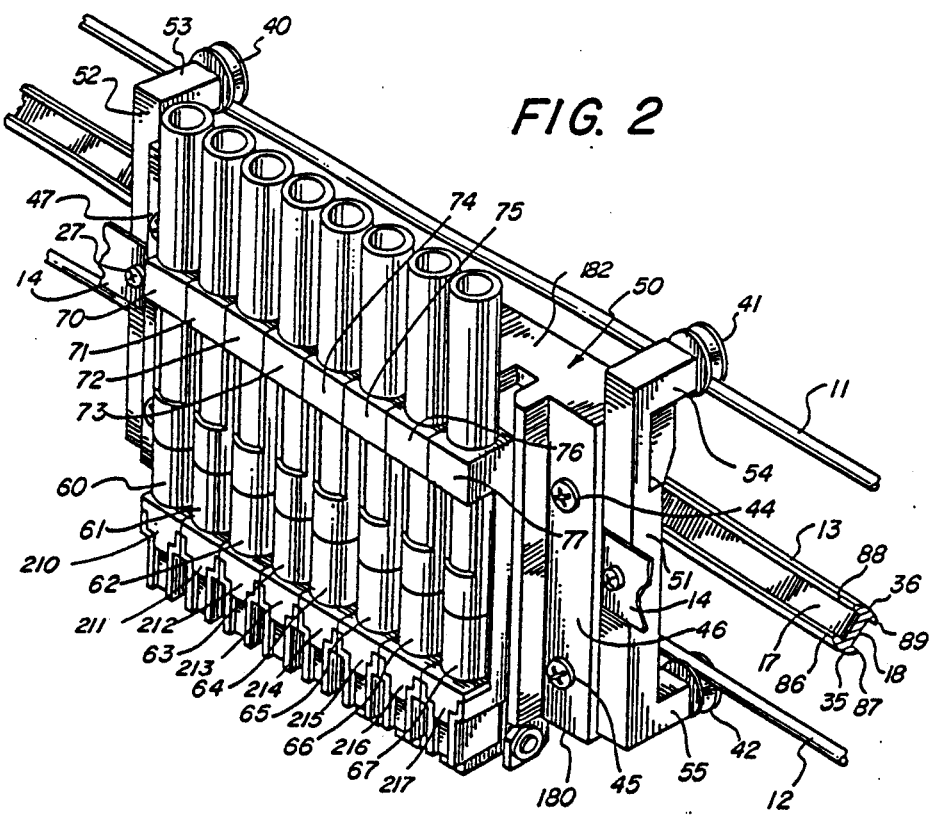
FIG. 2 is a front perspective view of a moveable pen carriage having locking pen support means constructed in accordance with the present invention.

FIG. 2 sets forth an enlarged and more detailed front perspective view of pen carriage 10 showing pen shuttles 70 through 77 supporting pens 60 through 67 respectively. Lock plates 210 through 217 secure pens 60 through 67 in a twist-lock arrangement described below in greater detail such that pens 60 through 67 are removably secured to pen shuttles 70 through 77 respectively. As mentioned above, pen carriage 10 is carried upon upper track 11 and lower track 12 by a quartet of grooved wheels 40 through 43 (the latter seen in FIG. 3). Pen shuttle guide 50 includes a rigid top 182 and rigid base 180 forming the upper end lower sides of the generally rectangular configuration of pen shuttle guide 50. Top 182 and base 180 of pen shuttle guide 50 are joined by a generally planar flange portion 46 on one side and an identical planar flange portion 47 on the other. In the preferred form, top 182, base 180 and flange portions 46 and 47 are combined in a single molded unit.

As mentioned, wheel supports 51 and 52 are identical in construction and are set forth in detail in the above-referenced copending application. However, suffice it to note here that the attachment of wheel support 51 to flange 46 and the attachment of wheel support 52 to flange 47 are identical. As is better seen in FIG. 3, wheel support 52 defines a pair of inwardly extending tabs 57 and 58 which extend behind flange portion 46 of pen shuttle guide 50 and are secured by threaded fasteners 44 and 45 to secure wheel support 51 to flange portion 46 of pen shuttle guide 50. A similar attachment occurs between wheel support 52 and flange portion 47 on the other side of pen shuttle guide 50. As is also set forth above, carriage band 14 is formed of a thin ribbon of stainless steel and extends uninterrupted through the entire structure of pen carriage 10 with the entire attachment of carriage band 14 to pen carriage 10 being provided by a pair of threaded fasteners 29 and 27.

Actuator beam 13 forms an approximate I-beam shape and defines a pair of longitudinally extending parallel channels 17 and 18 and an opposed pair of convex surfaces 35 and 36. In addition, actuator beam 13 defines a pair of longitudinally extending flat surfaces 88 and 89 at each side of convex surface 36 and a pair of similar flat surfaces 86 and 87 at each side of convex surface 35.

Figure 3:
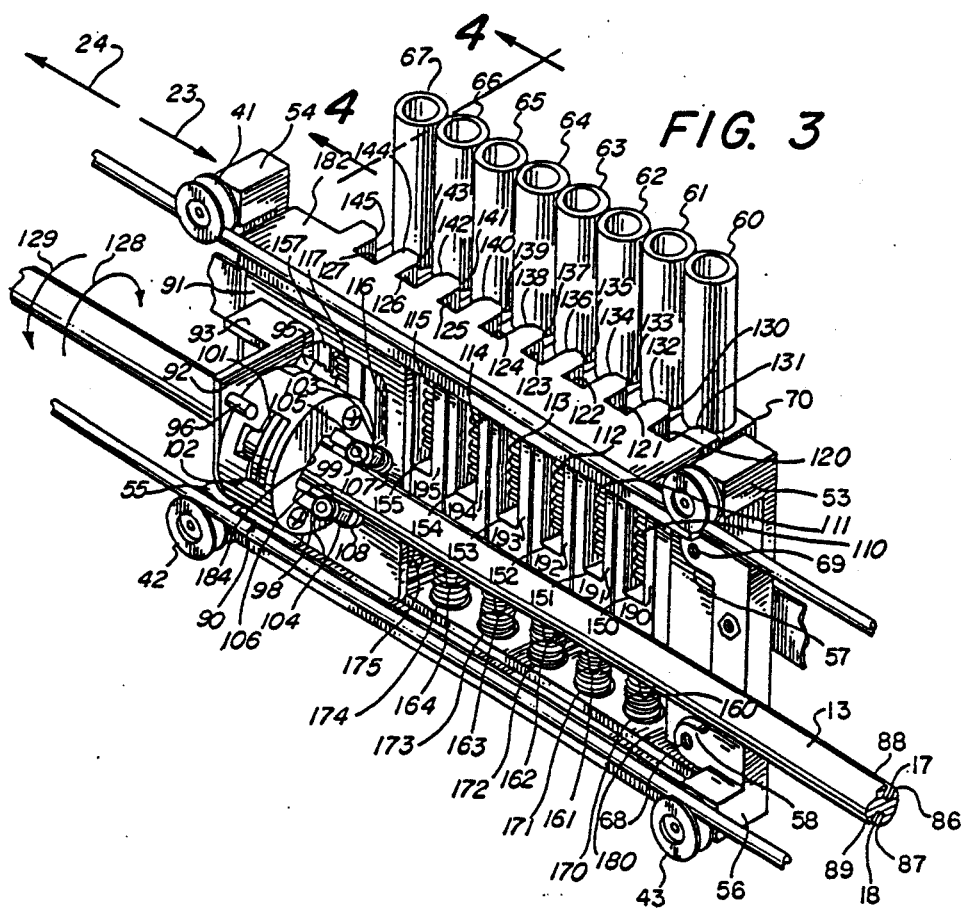
FIG. 3 is a rear perspective view of a moveable pen carriage having locking pen support means constructed in accordance with the present invention.

FIG. 3 sets forth a rear perspective view of pen carriage 10. As set forth above, pen carriage 10 is supported upon upper track 11 and lower track 12 by grooved wheels 40 through 43. As is also set forth above, pen carriage 10 defines a pen shuttle guide 50 which comprises a generally rectangular frame member and which is secured to wheel supports 51 and 52 in a precise alignment with upper track 11 and lower track 12. Top 182 of pen shuttle guide 50 defines a plurality of vertically extending pen channels 120 through 127 which are parallel to each other and substantially orthogonal to upper track 11 and lower track 12. Pen shuttle channel 120 defines a pair of inwardly extending angled surfaces 130 and 131 which extend the entire length of pen shuttle channel 120. Similarly, pen shuttle channel 121 defines a pair of angled surfaces 132 and 133, pen shuttle channel 122 defines a pair of angled surfaces 134 and 135, pen shuttle channel 123 defines a pair of angled surfaces 136 and 137, pen shuttle channel 124 defines angled surfaces 138 and 139, pen shuttle channel 125 defines angled surfaces 140 and 141, pen shuttle channel 126 defines angled surfaces 142 and 143, and pen shuttle channel 127 defines angled surfaces 144 and 145. By means set forth below in greater detail, pen shuttles 70 through 77 are received within pen shuttle channels 120 through 127 respectively and include bearing structures cooperating with the respective angled surfaces of pen shuttle channels 120 through 127 to provide a precise travel path for each of pen shuttles 70 through 77. A plurality of pen shuttle backs 190 through 197, the structures of which are set forth below in greater detail, are secured to pen shuttles 70 through 77 respectively by means of attachment also set forth below in greater detail. However, it is sufficient to note here that the attachment between pen shuttle backs 190 through 197 and pen shuttles 70 through 77 respectively captivates pen shuttles 70 through 77 in sliding engagement with pen shuttle channels 120 through 127 respectively. Pen shuttles 70 through 77 are biased to their raised positions shown in FIGS. 2 and 3 by a plurality of coiled springs 170 through 177 (springs 176 and 177 not shown). In other words, pen shuttles 70 through 77 are slideably moveable within pen channels 120 through 127 respectively and are maintained in their top most positions within channels 120 through 127 by the biasing of springs 170 through 177 respectively. However, springs 170 through 177 are selected to have spring constants which may be overcome and which permit pen shuttles 70 through 77 to be moved downwardly to the extended position shown occupied by pen 74 in FIG. 1. This downward position of course, corresponds to the extension of the recording pens which permits recording upon the media.

Pen shuttle backs 190 through 197 are of identical construction and define a plurality of elongated apertures 150 through 157 respectively. A plurality of gear racks 110 through 117 are supported within apertures 150 through 157 respectively in a substantially vertical arrangement.

As mentioned above, actuator beam 13 extends parallel to upper track 11 and lower track 12. Base 180 defines a downwardly extending channel 181 while top 182 defines a similar channel 183 which receive and support a generally planar drive carriage 91.

A generally planar support flange 92 is perpendicular to and joined to drive carriage 91. A gear stop 96 comprising a generally cylindrical extension is joined to support flange 92. While not visible in FIG. 3, support flange 92 also defines an aperture through which actuator beam 13 freely passes. A generally planar support 93 is joined to drive carriage 91 and the upper edge of support flange 92 to strengthen the attachment of support flange 92 to drive carriage 91. A rotary drive 90 comprises a generally cylindrical housing 100 defining a substantially rectangular center aperture 184 (better seen in FIG. 4) and a irregularly shaped aperture 101. A pair of generally rectangular bearing supports 103 and 104 are joined to and supported by the front surface of drive housing 100 adjacent opposite sides of aperture 184. Bearing support 103 supports an inwardly facing bearing 105 and transversely facing bearings 99 and 107. Similarly, bearing support 104 supports an inwardly facing bearing 106 and transversely facing bearings 98 and 108. A curved gear 95 extends outwardly from drive housing 100 and defines a radius of curvature slightly greater than that of drive housing 100. A shaft brake mechanism 102 is supported within drive housing 100 and is set forth below in greater detail.

Drive housing 100 is rotatably supported upon support flange 92 and is rotatable in the counterclockwise direction to a maximum counterclockwise position in which gear 95 approaches gear stop 96. As drive housing 100 is rotated from its maximum counterclockwise position, gear 95 moves to a position in which it extends through aperture 94 in drive carriage 91 and into the one of apertures 150 through 157 which are aligned with gear 95. In the position shown in FIG. 3, gear 95 is in alignment with aperture 157 of pen shuttle back 197 and therefore extends through aperture 177 therein. With continued clockwise rotation of drive housing 100, gear 95 engages gear rack 117 of pen shuttle back 197. Thereafter, further clockwise rotation of drive housing 100 causes a downward force to be exerted upon gear rack 117 which in turn overcomes the spring biasing force of spring 177 (not shown) and begins to move pen shuttle 77 in the downward direction. Finally, the clockwise motion of drive housing 100 moves gear rack 117 and pen shuttle 77 in the downward direction until the point of the selected pen contacts the media.

As mentioned above, actuator beam 13 extends through aperture 184 in drive housing 100 and flange support 92. As is also mentioned above, actuator beam 13 defines a general I-beam cross-section in which a pair of opposed longitudinal channels 17 and 18 extend the entire length of the actuator beam and in which a convex surfaces 35 and 36 extend outwardly from channels 17 and 18 on opposite ends thereof. A pair of flat surfaces 88 and 89 are defined on either side of convex surface 36 and a corresponding pair of flat surfaces 86 and 87 are defined on either side of convex surface 35. With respect to rotary drive 90, it should be noted that bearing supports 103 and 104 are positioned generally parallel to actuator beam 13. It should be further noted that bearing supports 103 and 104 are spaced from and oriented with respect to actuator beam 13 and aperture 184 such that inwardly facing bearings 105 and 106 are received within channels 17 and 18 respectively and transverse bearings 98, 99, 107 and 108 engage flat surfaces 86 and 87. As a result, the cooperation of bearings 98, 99, 105, 106, 107 and 108 of rotary drive 90 and channels 17 and 18 of actuator beam 13 facilitate a mechanical coupling between drive housing 100 and actuator beam 13 without restricting the free movement of rotary drive 90 with respect to actuator beam 13.

As mentioned above, housing 100 supports an internal brake mechanism 102, which is set forth below in greater detail. However, suffice it to note here that brake mechanism 102 is operative in response to counterclockwise rotation of actuator beam 13. As gear 95 is rotated toward gear stop 96, brake mechanism 102 engages convex surfaces 35 and 36 to secure rotary drive 90 to actuator beam 13. In its preferred operation, brake 102 engages beam 13 while gear 95 is approximately fifteen degrees away from gear stop 96. In accordance with the operation described below, the securing of brake 102 to convex surfaces 35 and 36 is released when actuator beam 13 is rotated in the clockwise direction from its maximum counterclockwise position.

In operation, pen carriage 10 is moveable, as described above, upon tracks 11 and 12 in the directions indicated by arrows 23 and 24. All motion of pen carriage 10 in the directions indicated by arrows 23 and 24 is imparted by carriage band 14 in accordance with the above-described actions of carriage motor 16, drive pulley 30 and gears 32 and 33. Because drive carriage 91 is freely moveable with respect to pen carriage 10 within channels 181 and 183 of pen shuttle guide 50, rotation of actuator beam 13 to its counterclockwise position causes brake 102 to grasp convex surfaces 35 and 36 and maintains the position of rotary drive 90 upon actuator beam 13 notwithstanding motion of pen carriage 10. Accordingly, with actuator beam 13 in the counterclockwise position and rotary drive 90 secured to actuator beam 13, motion of pen carriage 10 produces a relative motion between rotary drive 90 and pen carriage 10. Because pen carriages 70 through 77 and pens 60 through 67 supported therein are arranged in a linear array along the direction of travel of pen carriage 10, selection of a desired one of pens 60 through 67 for recording use is accomplished by locking rotary drive 90 to actuator beam 13 by counterclockwise motion and thereafter moving pen carriage 10 until gear 95 of rotary drive 90 is aligned with the one of apertures 110 through 117 in the pen carriage back corresponding to the desired pen.

Specifically, with the relative positions of pen carriage 10 and rotary drive 90 shown in FIG. 3 in which gear 95 is aligned with aperture 157 of pen shuttle back 197 corresponding to pen 67, the desired one of the remaining pens 60 through 66 is selected by rotating actuator beam 13 to lock rotary drive 90 to actuator beam 13. Next, pen carriage 10 is moved in the direction indicated by arrow 24 until gear 95 is brought into alignment with the aperture in the pen shuttle back corresponding to the desired pen. For example, in the event pen 63 is selected for next use, pen carriage 10 is moved in the direction of arrow 24 until gear 95 is aligned with aperture 153 in pen shuttle back 193. Thereafter, pen carriage 10 is momentarily stopped while actuator beam 13 is rotated in the clockwise direction indicated by arrow 128 which simultaneously releases brake 102 and moves gear 95 into aperture 153. Once brake 102 is released and gear 95 extends into aperture 153 of pen shuttle back 193, motion of pen carriage 10 in either of the directions indicated by arrows 23 or 24 may be resumed. At this point, gear 95 assumes the position shown in FIG. 4 which corresponds to the "rest position" of the actuator system. Pen 63 has not yet been brought into a downward movement to facilitate contact with the media. Once pen carriage 10 has reached the position over the media at which it is desired to begin recording upon the media, actuator beam 13 is rotated in the clockwise direction indicated by arrow 128 to cause gear 95 to engage rack 113 and drive pen shuttle 73 and thereby pen 63 downward until contact with the media is established. With contact established with the media by pen 63, the motions of pen carriage 10 and the media set forth in descriptions accompanying FIG. 1 is undertaken to carry out the plotting operation. Note that the shape of the first tooth or leading edge of gear 95 is shaped so that after a short rotation, gear 95 will engage with the selected one of gear racks 110 through 117 properly.

The pen selection process is set forth in greater detail in the above-referenced copending application. However, suffice it to state here that pen selection is performed by simply securing rotary drive 90 at a fixed position with respect to actuator beam 13 by counterclockwise rotation of actuator beam 13 to a predetermined position and moving carriage 10 until the appropriate pen is aligned. Rotation of actuator beam 13 causes rotary drive 90 to engage pen carriage 10 at the point corresponding to the selected pen causing rotary drive 90 to be carried by pen carriage 10. It should be noted rotary drive 90 continues to be carried by pen carriage 10 in either the rest position or the recording position. As a result, vertical pen motions in and out of engagement with the media necessary to undertake the above-described plotting operation, simply require rotation of actuator beam 13 to raise and lower the engaged pen shuttle and thereby the operative pen. FIGS. 4 and 5 set forth partially sectioned views of pen carriage 10 and rotary drive 90 and depict different positions of rotary drive 90. FIG. 4 sets forth the recorder rest position in which a selected pen has been engaged but is not moved into the recording position. FIG. 5 sets forth the recorder with the selected pen in the write or record position.

With respect to FIG. 4, pen shuttle guide 50 defines a top 182 having an upwardly extending channel 183 and a base 180 having a downwardly extending channel 181. Pen shuttle guide 50 defines a pen channel 127, the structure of which is set forth above. Pen shuttle 77 supports pen 60 in a vertical position which is secured in accordance with the invention by a twist-lock attachment by lock plate 217 in a manner set forth below in greater detail. Pen shuttle 77 further defines a pair of inwardly extending generally cylindrical bosses 198 and 199. Pen shuttle 77 further supports a plurality of ball bearings 202, 203, 204 and 205 as well as an additional similar plurality of the ball bearings (not seen) on the other side of rib 109. The function of ball bearings associated with rib 109 of pen shuttle 77 is to provide a suitable rolling bearing for sliding contact with angled surfaces 144 and 145 of pen shuttle channel 127. Bosses 198 and 199 are received within pen shuttle back 197 and secured thereto by a pair of threaded fasteners 200 and 201. As mentioned, pen shuttle back 197 defines an aperture 157 within which gear rack 117 is supported. Gear rack 117 defines a generally tapered surface 118. A generally flat edge 185 forms the bottom surface of aperture 157. Pen shuttle back 197 further defines a generally conical, downwardly extending spring guide 167. Base 180 further defines a recess 146. A coiled spring 177 is compressively supported at one end within recess 146 and at the other end by its encircling of spring guide 167. While any number of springs may be used for spring 177, it has been found advantageous to use a combination of a left hand and right hand wound nested pair. Actuator beam 13 extends through aperture 184 in rotary drive housing 100 and is engaged by bearings 98, 99 and 105 through 108 as described above. Drive housing 100 is supported by support flange 92 and gear 95 extends outwardly from drive housing 100. A pen cap 206 is pivotally supported beneath base 180 by a pin 209. Pen cap 206 further defines a gear portion 207 concentrically positioned with respect to pin 209. Pen shuttle 77 defines a gear rack 208 which engages gear portion 207.

In the position shown in FIG. 4, rotary drive 90 is in the rest position in which gear 95 extends into aperture 157 of pen shuttle back 197 and in which brake 102 is disengaged from actuator beam 13. In this position, and as described above, rotary drive 90 is freely carried by the motion of pen carriage 10 and the compressive force of spring 177 urges pen shuttle 77 upwardly removing pen 67 from contact with the media. Once actuator beam 13 is rotated in the clockwise direction rotating drive housing 100 and gear 95, a downward force is applied to edge 185 of aperture 157 by edge 186 of gear 95 which overcomes the force of spring 177 and moves pen shuttle back 197 and thereby pen shuttle 77 downwardly. With continued rotation of drive housing 100, gear 95 engages gear rack 117 and the downward motion of pen shuttle 77 continues. It should also be noted that pen cap 206 is in its closed position when pen shuttle 77 is in the rest position shown in FIG. 4.

As mentioned, FIG. 5 is identical to FIG. 4 with the exception that pen shuttle 77 and pen 67 have been moved to the recording position by rotation of drive housing 100 and the cooperation of gear 95 and rack 117. In either event, spring 177 is compressed within recess 146 in base 180 and is captivated by the extension of spring guide 167 into recess 146. It should be noted that in the position shown in FIG. 5, brake 102 is out of contact with actuator beam 13 and rotary drive 90 is released from any engagement with actuator beam 13. This permits the above-described motion of the combination of rotary drive 90 and pen carriage 10 as pen 67 is used to record upon the media. With pen shuttle 77 in its downward position, gear rack 208 pivots gear portion 207 and pen cap 206 to expose pen point 189.

FIG. 6 sets forth an exploded view of the present invention pen mounting system in which pen shuttle 77 defines an upper support 220 which in turn defines a cylindrical aperture 221. Pen shuttle 77 further defines a concave surface 221 which defines an aperture 223 near one end thereof. Pen shuttle 77 further defines a lower support 224 which in turn defines a cylindrical passage 230 and a recess 231. A planar surface 225 surrounds recess 231 and defines a valley 232. Lower support 224 further defines an elongated channel 234 having a recess 233 therein and a pair of rectangular notches 235 and 236. As is better seen in FIG. 7, passage 230 terminates at its lower end in a tapered surface 270. A lock plate 217 defines a generally planar base member 242 which in turn defines a circular aperture 243 having a pair of outwardly extending opposed notches 244 and 245. Planar base member 242 further defines an outwardly extending cylindrical pin 240. Lock plate 217 further includes a flange member 250 joined to and generally perpendicular to planar base member 242. Flange 250 defines a pair of step portions 251 and 252 and a generally cylindrical pin 241.

A recording pen 67 defines a generally cylindrical body 281 having an interior cavity 282 and further defining a generally rectangular elongated window aperture 283. Cylindrical body 281 further defines an edge 294 and a cylindrical extension 290 extending downwardly from edge 294. Extension 290 further defines a pair of outwardly extending opposed pins 291 and 292 and a tapered conical surface 293. In accordance with conventional fabrication techniques, recording pen 67 further includes a recording element tip 189 extending downwardly from tapered surface 293 and an ink cartridge 284 supported within interior cavity 282. In further accordance with conventional fabrication techniques, but not shown, pen 67 includes conventional apparatus for coupling recording element tip 189 to an ink supply 286 contained within ink cartridge 284 such that a flow of ink from ink supply 286 to tip 189 for recording operation. Ink supply 286 defines an ink level 285 which in accordance with an important aspect of the present invention is observable through window 283.

The assembly of pen 67 to pen shuttle 77 is carried forward by initially assembling lock plate 217 to pen shuttle 77 by placing planar base 242 in alignment with surface 225 of lower support 224 and thereafter sliding planar base 242 across surface 225 until pin 240 is received within aperture 223 and simultaneously flange 250 is received within channel 234 and steps 251 and 252 are received within notches 236 and 235 respectively. As pin 240 is received within aperture 223, pin 241 is similarly received within recess 233. The completed assembly of lock plate 217 to pen shuttle 77 is better seen in FIG. 8 and is maintained by the precision fit between pins 240 and 241 and aperture 223 and recess 233 respectively. In its preferred form, lock plate 217 and pen shuttle 77 are formed of molded plastic material and the fit of pins 240 and 241 within aperture 223 and recess 233 respectively is an interference fit which maintains the position of lock plate 217 upon pen shuttle 77.

With lock plate 217 assembled to pen shuttle 77 as described and as is better shown in FIG. 8, pen 67 is assembled to pen shuttle 77 by passing extension 290 and cylindrical body 281 downwardly through aperture 221 in upper support 220 and past concave surface 222. It should be noted that cylindrical body 281 has a diameter greater than the extension of pins 291 and 292. It should be further noted that aperture 221 is sized to receive cylindrical body 281 in a somewhat precision fit such that cylindrical body 281 is supported within upper support 220. As pen 67 is further received within pen shuttle 77, extension 290 is passed through aperture 243 of lock plate 217 and extends into passage 230. At this point, pins 291 and 292 are aligned with notches 245 and 244 respectively and pass therethrough as pen 67 continues to move downwardly. Once pins 291 and 292 have passed through notches 245 and 244 respectively, they abut recess 231. Thereafter, assembly of pen 67 within pen shuttle 77 is completed by rotating pen 67 in the manner indicated by arrow 287 which in turn rotates pin 292 to the rear portion of recess 231 and rotates pin 291 into valley 232. As is better seen with temporary reference to FIG. 10, lock plate 217 further defines a pair of downwardly extending ribs 260 and 261 which are spaced apart upon under surface 255 of lock plate 217 to form a valley 262 therebetween. As is better seen in FIG. 8, the assembly of lock plate 217 to pen shuttle 77 results in the alignments of ribs 260 and 261 and valley 262 with valley 232 of lower support 224. As pin 291 is forced between rib 261 and valley portion 232, the resilience of lock plate 217 provides sufficient give to permit the continued rotation of pen 67 and the passage of pin 291 into valley 262. Thereafter, the resilience of lock plate 217 captivates pin 291 between ribs 260 and 261 within valley 232. Thus, the assembly of pen 67 to pen shuttle 77 is carried forward by the above-described ninety degree twist-lock assembly. It should be noted that window 283 is aligned with pin 291 and as a result the above-described twist-locking assembly also results in facing window 283 outwardly from pen shuttle 77 as is better seen in FIG. 2 with the result that ink supply 286 and particularly ink level 285 may be readily viewed from the front portion of the pen carriage.

FIG. 7 sets forth a section view of pen shuttle 77 taken along section lines 7—7 in FIG. 6. In the view shown in FIG. 7, lock plate 217 is assembled to pen carriage 10 in the foregoing described manner. Thus, pen shuttle 77 defines a concave surface 222 and a lower support 224. Lower support 224 defines a cylindrical passage 230 terminating in a tapered surface 270. In addition, tapered surface 270 further defines a trio of projections 271, 272 and 273 extending outwardly from taper 270. Lock plate 217 defines planar member 242 overlying passage 230 and assembled thereto such that aperture 243 of lock plate 217 is concentric with passage 230. As described above, planar member 242 further defines a pair of outwardly extending notches 244 and 245 and a pair of downwardly extending spaced apart ribs 260 and 261 shown in dashed-line representation. Recess 231 which extends beyond aperture 243 is defined in lower support 224 and is shown in dashed-line representation. Examination of FIG. 7 shows that the concentric arrangement of passage 230, taper portion 270, aperture 243 and recess 231 facilitates the above-described twist-lock assembly of pen 67 in which extension 290 thereof is received within passage 230. It should also be apparent from FIG. 7 the manner in which pins 291 and 292 are passed through notches 245 and 244 respectively to be received upon recess 231 and thereafter rotated to bring pin 291 to its captivated position between ribs 260 and 261 to lock pen 67 in place.

FIG. 8 sets forth a section view of lower support 224 having lock plate 217 assembled thereto and taken along section lines 8—8 in FIG. 6. Lower support 224 defines cylindrical passage 230 which terminates at one end in a taper portion 270. As mentioned above, taper portion 270 further defines a plurality of projections 271, 272 and 273 (the latter seen in FIG. 7). Recess 231 extends outwardly above passage 230. Lower support 224 further defines a recess 233, a channel 234, and an aperture 223. Lock plate 217 defines planar member 242 and flange 250. In accordance with the invention, planar member 242 defines a pin 240 received within aperture 223 while flange 250 defines a pin 241 received within recess 233. As described above, the cooperation of pins 240 and 241 with aperture 223 and recess 233 respectively secures lock plate 217 in the position shown in FIG. 8. Planar member 242 defines aperture 243 and a pair of outwardly extending notches 244 and 245 (the latter seen in FIG. 7). Recess 231 defines a valley portion 232 and planar member 242 defines a downwardly extending pair of ribs 260 and 261 (the latter seen in FIG. 10).

FIG. 9 sets forth the section view of FIG. 8 having pen 67 assembled to pen shuttle 77 in the manner described above. Accordingly, cylindrical body 281 of pen 67 is received against concave surface 222 while edge 294 of cylindrical body 281 rests upon planar member 242 of lock plate 217. In further accordance with the above-described assembly, cylindrical extension 290 extends into and is received within passage 230 while taper portion 293 is received within taper 270 of passage 230. It should be noted that the lengths of passages 230 and tapered portion 270 as well as the lengths of extension 290 and taper 293 are selected such that tip 179 of pen 67 extends beyond the lower end of lower support 224 to permit pen 67 to record upon the media in the manner shown in FIG. 5. It should be further noted that, in the assembled position shown, pin 291 is received within valley 232 and is positioned between ribs 260 and 261 (the latter shown in FIG. 10). Similarly, pin 292 is received within recess 231. Projections 271, 272 and 273 (the latter seen in FIG. 7) abut tapered surface 293 of cylindrical extension 290 to provide a small space 295 between taper 270 and tapered surface 293. Projections 271 through 273 function to absorb tolerance variations and facilitate the alignment of extension 290 within passage 230.

FIG. 10 sets forth a perspective view of lock plate 217 inverted to better show the functional elements on the underside thereof. Accordingly, lock plate 217 defines a planar member 242 having an under surface 255 which in turn defines a pair of spaced apart ribs 260 and 261 defining a valley 262 therebetween. A flange 250 is joined to planar member 242 and defines steps 251 and 252 on either side of flange 250. Flange 250 further defines an extending generally cylindrical pin 241. Planar member 242 defines a circular aperture 243 having a pair of outwardly extending opposed notches 244 and 245. Planar member 242 further defines a circular portion 253 which in turn supports an outwardly extending pin 240.

It should be recalled that while the detailed assembly and structure of pen shuttle 77, lock plate 217, and the mounting and support of pen 67 have been set forth herein in great detail, these corresponding structures of pen shuttles 70 through 76, lock plates 210 through 216, and pens 60 through 66 are identical to the above-described structure and the descriptions herein apply equally well thereto. It should be further apparent from examination of the foregoing described structure that the present invention locking pen support system permits the recording pens to be quickly and easily secured within and removed from their respective pen shuttles through the simple ninety degree twist-lock manipulation described. It will be equally apparent to those skilled in the art that while recording pens have been shown as examples of recording elements within the inventive structure, the present invention structure applies equally well and may be used with equal advantage with different recording elements other than ink pens. It should be further apparent to those skilled in the art that while the present invention preferred embodiment comprises a linear array of pen shuttles supported upon a pen carriage, the present invention structure is equally well suited to use within other single recording pen carriage recorders and with multiple pen recorders utilizing different pen shuttle arrays. As a result, the present invention locking pen mounting system permits easy interchange removal and replacement of recording pens without extensive machine downtime and without the need to disturb the pen carriage.

While particular embodiments of the invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention.

That which is claimed is:

1. For use in a graphic recorder in which a moveable pen carriage defines a plurality of pen shuttle channels for slideably receiving a corresponding plurality of pen shuttles, recording pen locking support means comprising:

a plurality of recording pens each having a generally cylindrical body portion, a recording element tip, and a generally cylindrical bayonet mounting extension coupled to said body portion and having a planar member defining an aperture having a pair of opposed outwardly extending clearance notches overlying said passages, a pin recess interposed between said planar member and said passage, and snap means for engaging one of said pins, said bayonet mounting extension including first lock means having a pair of opposed pins extending outwardly from said bayonet mounting extension;

a plurality of pen shuttles each having means for slidable attachment within one of said pen shuttle channels and a bayonet mounting receptacle having a generally cylindrical passage, for receiving said bayonet mounting extension, having second lock means; and said first and second lock means cooperating to secure said bayonet mounting extension within said bayonet mounting receptacle, said bayonet mounting extension each being received within one of said bayonet mounting receptacles by placing said cylindrical extension through said aperture and into said passage in a first rotational position in which said pins are aligned with said clearance notches and thereafter rotating said pen to second rotational position in which one of said extending pins engages said snap means.

2. Recording pen locking support means as set forth in claim 1 wherein said generally cylindrical passages each include an inwardly tapered portion and wherein said bayonet mounting extensions each include a tapered conical portion corresponding to said inwardly tapered portions of said passages.

3. Recording pen locking support means as set forth in claim 2 wherein each of said planar members is formed on a removable lock plate and is separable from said pen shuttles.

4. Recording pen locking support means as set forth in claim 3 wherein each of said lock plates define a first plate having said aperture and clearance notches defined therein and flange member orthogonal to said plate and wherein said pen shuttles each define a locating channel for receiving said flange members.

5. Recording pen locking support means as set forth in claim 4 wherein each of said pin recesses includes a valley portion and wherein each of said plates defines an undersurface overlying said pin recess and wherein each of said snap means includes a pair of spaced apart projections defined on each of said undersurfaces proximate each of said valley portions.

6. Recording pen locking support means as set forth in claim 5 wherein each of said lock plates define a first pin extending from said plate and a second pin extending from said flange member and wherein each of said pen shuttles includes a pair of apertures receiving said first and second pins to removably secure said lock plates to said pen shuttles.

7. In a graphic recorder having a moveable pen carriage, a plurality of pen shuttles movably supported thereon, and a plurality of recording pens; recording pen locking and support means comprising:

male and female bayonet mounting means defined in each of said recording pens and pen shuttles respectively for removably securing each of said recording pens to a respective one of said pen shuttles in a twist-locking attachment, said male bayonet mounting means each including a generally cylindrical extension having a pair of outwardly extending pins having tapered end portions and said female bayonet mounting means each including a generally cylindrical passage defining an inwardly tapered seat configured to receive said tapered end portion of said generally cylindrical extension and lock means for captivating said outwardly extending pins.

8. Recording pen locking support means as set forth in claim 7 wherein each of said female bayonet mounting means include a removable lock plate secured to each of said pen shuttles defining a planar member and a flange member perpendicular thereto, said planar member defining an aperture sized to receive said generally cylindrical extension and a pair of outwardly extending notches for receiving said outwardly extending pins when said recording pen is rotationally positioned in a first rotational alignment.

9. Recording pen locking support means as set forth in claim 12 wherein each of said generally cylindrical passages includes a pin depression and wherein each of said planar members of said lock plates define a lower surface having a pair of spaced apart projections extending into said pin depression.

10. Recording pen locking support means as set forth in claim 9 wherein each of said pen shuttles defines a pair of apertures and wherein said planar member and said flange member of each of said lock plates define outwardly extending pins received within said pair of apertures to secure said lock plate to said pen shuttle.

11. Recording pen locking support means as set forth in claim 10 wherein said recording pens each include a pen body coupled to said generally cylindrical extension and supporting a supply of ink within said pen body and wherein said pen body further defines a viewing aperture to said ink supply having a predetermined alignment with said outwardly extending pins.

12. Recording pen locking support means as set forth in claim 11 wherein said tapered seats each define a plurality of projections spacing said tapered end portions from said tapered seats.

13. For use in a graphic recorder having a moveable pen carriage, a twist-locking pen support system comprising:
  a pen shuttle slideably supported upon said pen carriage and having a pen receptacle defining a cylindrical passage, a lower end defining an inwardly tapered conical pen seat, and an upper end having a generally cylindrical recess, said cylindrical recess extending outwardly beyond said cylindrical passage;
  a recording pen having a writing end defining a cylindrical pen extension, a pair of outwardly extending pins and a tapered conical end portion; and
  a lock plate having a generally planar portion defining a circular aperture larger than said cylindrical passage and smaller than said cylindrical recess defining a pair of outwardly extending notches and having a flange portion joined to said planar portion and generally perpendicular thereto, said lock plate attaching to said pen shuttle such that said planar portion overlies said pen receptacle and said circular aperture is concentric with said cylindrical passage;
  said recording pen being secured to said pen shuttle by aligning said recording pen in a first rotational position in which said cylindrical extension is aligned with said circular aperture and said pins are aligned with said notches, passing said cylindrical extension into said cylindrical passage and passing said pins through said notches and thereafter rotating said pen to a second rotational position in which said pins are nonaligned with said notches and are captivated within said cylindrical recess by said planar portion.

14. A twist-locking pen support system as set forth in claim 13 wherein said cylindrical recess defines a depression and wherein said planar portion defines an undersurface having a pair of projections extending toward said depression, said projections and said depression cooperating to grasp one of said pins in said second rotational position of said recording pen.

* * * * *